US012664455B2

(12) United States Patent
Dhand et al.

(10) Patent No.: US 12,664,455 B2
(45) Date of Patent: Jun. 23, 2026

(54) METHODS FOR IN-SITU CHARACTERIZATION OF GAUSSIAN BOSON SAMPLING (GBS) DEVICES

(71) Applicant: Xanadu Quantum Technologies Inc., Toronto (CA)

(72) Inventors: Ish Dhand, Ulm (DE); Shreya Prasanna Kumar, Ulm (DE)

(73) Assignee: Xanadu Quantum Technologies Holdings ULC, Toronto (CA)

( * ) Notice: Subject to any disclaimer, the term of this patent is extended or adjusted under 35 U.S.C. 154(b) by 911 days.

(21) Appl. No.: 17/845,343

(22) Filed: Jun. 21, 2022

(65) Prior Publication Data

US 2023/0042396 A1     Feb. 9, 2023

Related U.S. Application Data

(60) Provisional application No. 63/214,494, filed on Jun. 24, 2021.

(51) Int. Cl.
G06N 10/40 (2022.01)
G06N 10/60 (2022.01)

(52) U.S. Cl.
CPC ............. G06N 10/40 (2022.01); G06N 10/60 (2022.01)

(58) Field of Classification Search
CPC ........ G06N 10/00; G06N 10/20; G06N 10/40; G06N 10/60; G06N 10/70; G06N 10/80
USPC ........................................................ 716/100
See application file for complete search history.

(56) References Cited

U.S. PATENT DOCUMENTS

| | | | |
|---|---|---|---|
| 10,649,307 B2 | 5/2020 | Vernon et al. | |
| 10,809,592 B2 | 10/2020 | Dutt et al. | |
| 11,593,699 B2 | 2/2023 | Bradler et al. | |
| 11,815,696 B1 | 11/2023 | Sabapathy et al. | |

(Continued)

FOREIGN PATENT DOCUMENTS

| | | |
|---|---|---|
| CA | 3055860 A1 | 3/2021 |
| CN | 103791845 A | 5/2014 |

(Continued)

OTHER PUBLICATIONS

Non-Final Office Action for U.S. Appl. No. 18/377,939 mailed Aug. 14, 2024, 7 pages.

(Continued)

*Primary Examiner* — Paul Dinh

(74) *Attorney, Agent, or Firm* — Cooley LLP

(57)                ABSTRACT

A method includes causing activation, at a first time, of a first set of squeezed light sources from a plurality of squeezed light sources of a Gaussian boson sampling (GBS) circuit. At a second time after the first time, a first photon statistic is detected at a first output port from a plurality of output ports of the GBS circuit. At a third time after the first time, a second set of squeezed light sources from the plurality of squeezed light sources of the GBS circuit is activated, the second set of squeezed light sources being different from the first set of squeezed light sources. At a fourth time after the third time, a second photon statistic is detected at a second output port from the plurality of output ports of the GBS circuit. At least one transformation matrix is estimated that represents a linear optical interferometer of the GBS circuit based on the first photon statistic and the second photon statistic.

20 Claims, 6 Drawing Sheets

(56)　　　　　References Cited

U.S. PATENT DOCUMENTS

| | | | |
|---|---|---|---|
| 11,972,323 | B2 | 4/2024 | Bradler et al. |
| 12,253,684 | B2 | 3/2025 | Sabapathy et al. |
| 2014/0299743 | A1 | 10/2014 | Miller |
| 2015/0354938 | A1 | 12/2015 | Mower et al. |
| 2016/0156466 | A1 | 6/2016 | Kirby et al. |
| 2016/0245639 | A1 | 8/2016 | Mower et al. |
| 2016/0290897 | A1 | 10/2016 | Bakharev et al. |
| 2022/0051124 | A1 | 2/2022 | Bradler et al. |
| 2023/0177374 | A1 | 6/2023 | Bradler et al. |
| 2024/0053615 | A1 | 2/2024 | Sabapathy et al. |
| 2024/0183692 | A1* | 6/2024 | Gopinath ............... G06N 10/40 |
| 2024/0346357 | A1 | 10/2024 | Alexander |
| 2025/0189806 | A1 | 6/2025 | Sabapathy et al. |

FOREIGN PATENT DOCUMENTS

| | | |
|---|---|---|
| CN | 108957903 A | 12/2018 |
| CN | 109477938 A | 3/2019 |
| CN | 112384748 A | 2/2021 |
| EP | 3444657 A1 | 2/2019 |
| JP | 2003256668 A | 9/2003 |
| WO | WO-2020232546 A1 | 11/2020 |

OTHER PUBLICATIONS

Office Action for Japanese Application No. 2021-566944 mailed Sep. 30, 2024, 4 pages.

Office Action for Japanese Application No. JP2021566944 dated May 9, 2024, 4 pages.

Takase et al., "Generation of Flying Logical Qubits using Generalized Photon Subtraction with Adaptive Gaussian Operations", arXiv:2401.07287v1, [quant-ph], Jan. 14, 2024, 9 pages.

Takase et al., "Gottesman-Kitaev-Preskill qubit synthesizer for propagating light", npj Quantum Information (2023) 98, pp. 1-11.

Extended European Search Report for European Application No. 20810403.4 dated Mar. 20, 2023, 10 pages.

Paesani, S., et al., "Generation and sampling of quantum states of light in a silicon chip", arxiv.org, Cornell University Library, 201 Olin Library Cornell University Ithaca, NY 14853, Dec. 7, 2018 (Dec. 7, 2018), XP081486882, DOI: 10.1038/S41567-019-0567-8, Supplementary material, p. 1-5.

Extended European Search Report for European Application No. 24205992.1 mailed Apr. 11, 2025, 12 pages.

Office Action and Search Report for Italian Application No. IT2024000013108 mailed Feb. 4, 2025, with English translation, 9 pages.

Arrazola, J. M. & Bromley, T. R., "Using Gaussian Boson Sampling to Find Dense Subgraphs," Phys. Rev. Lett., 121: 030503 (2018), 6 pages; https://doi.org/10.1103/PhysRevLett.121.030503.

Bradler, K. et al. "Gaussian boson sampling for perfect matchings of arbitrary graphs." Physical Review A, 98: 032310 (2018), 17 pages; doi:10.1103/PhysRevA.98.032310.

Brod, D. J. et al., "Photonic implementation of boson sampling: a review," Advanced Photonics, 1 (3): 034001(2019), 34 pages; https://doi.org/1 0.1117/1.AP.1.3.034001.

Carolan, J. et al., "Universal linear optics," Science, 349 (6249): 771-716 (2015).

Crespi, A. et al., "Experimental boson sampling in arbitrary integrated photon circuits," Nature Photonics, 7: 545 (2013), 10 pages; https://link.aps.org/doi/10.1103/PhysRevA.47.733.

Dutt, "On-Chip Quantum and Nonlinear Optics from Squeezing to Spectroscopy", Cornell University, Dissertation, Aug. 2017, 210 pages.

Dutt, et al., "On-Chip Optical Squeezing". Physical Review Applied. Sep. 2013, vol. 3, Iss. 4, Apr. 2015, 8 pages.

First Office Action dated Mar. 23, 2022 for Chinese Application No. 202080037617.4, with English translation, 46 pages.

Hamilton, C. S. et al., "Gaussian Boson Sampling," Phys. Rev. Lett., 119: 170501 (2017), 5 pages; https://doi.org/10.48550/arXiv.1612.01199.

https://github.com/XanaduAI/strawberryfields; retrieved on Oct. 15, 2021, 4 pages.

Huh, J. et al., "Boson sampling for molecular vibronic spectra," Nature Photonics, 9:615-620 (2015), 10 pages.

International Search Report and Written Opinion mailed Aug. 18, 2020 for International Application No. PCT/CA2020/050675, 6 pages.

Killoran, N. et al., "Strawberry Fields: A Software Platform for Photonic Quantum Computing," Quantum, 3:129 (2019); arXiv:1804.03159v1, 27 pages.

Lita, A. E. et al., "Superconducting transition-edge sensors optimized for high-efficiency photon-number resolving detectors," Proc. SPIE 7681, Advance Photon Counting Techniques IV, 7681 OD (2010), 11 pages; doi:10.1117/12.852221.

Lo et al. "Generalized Multimode Squeezed States", Physical Review A, 1993, pp. 733-735.

Office Action for Chinese application No. CN20208037617.4, mailed on Aug. 24, 2022, 19 pages.

Sabapathy, K. et al., "Production of photonic universal quantum gates enhanced by machine learning," Phys. Rev. A, 100:012326 (2019); arXiv:1809.04680v2 Sep. 5, 2019, 11 pages.

\* cited by examiner

300A

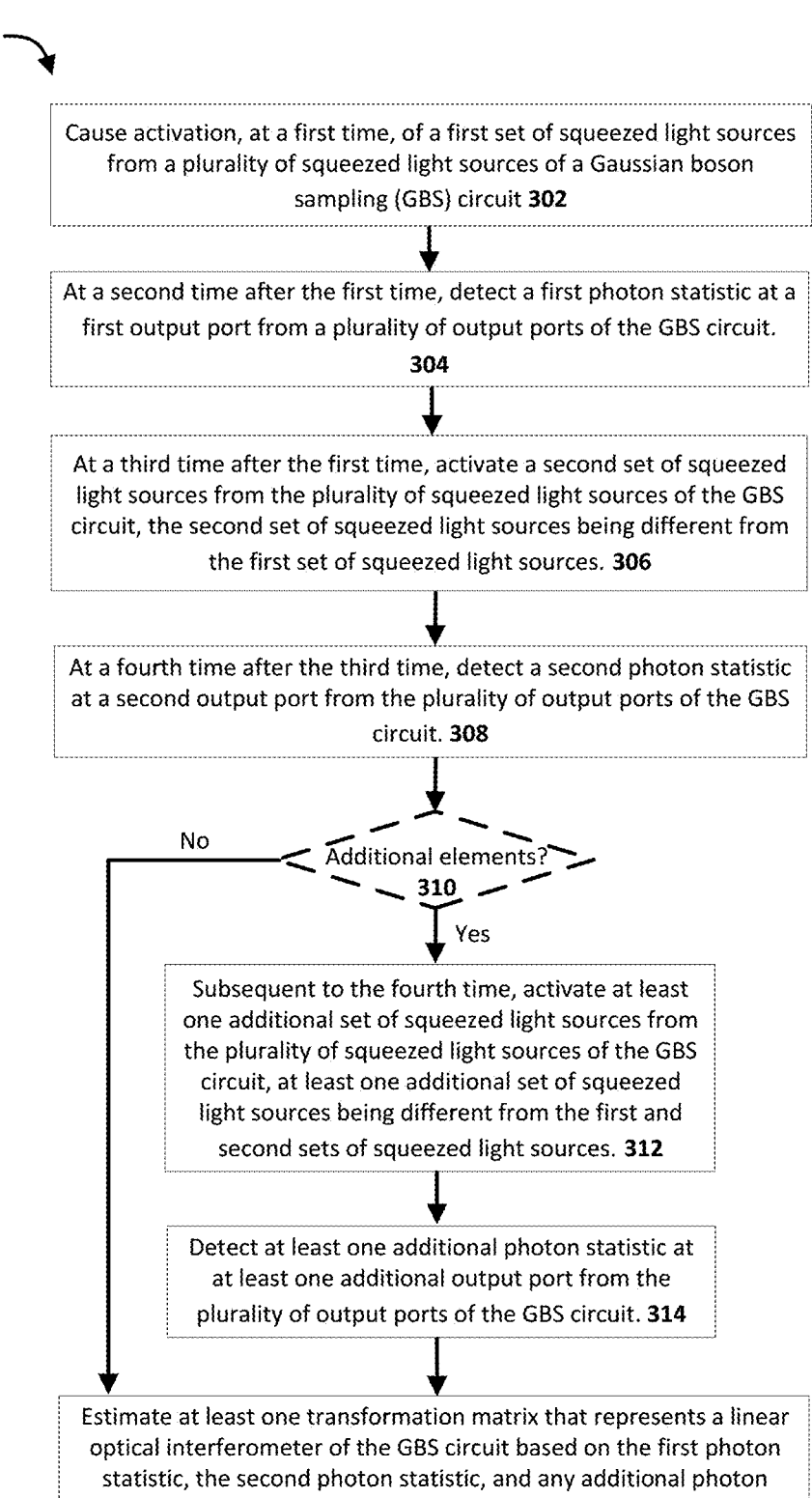

Cause activation, at a first time, of a first set of squeezed light sources from a plurality of squeezed light sources of a Gaussian boson sampling (GBS) circuit 302

At a second time after the first time, detect a first photon statistic at a first output port from a plurality of output ports of the GBS circuit. 304

At a third time after the first time, activate a second set of squeezed light sources from the plurality of squeezed light sources of the GBS circuit, the second set of squeezed light sources being different from the first set of squeezed light sources. 306

At a fourth time after the third time, detect a second photon statistic at a second output port from the plurality of output ports of the GBS circuit. 308

Additional elements? 310

No

Yes

Subsequent to the fourth time, activate at least one additional set of squeezed light sources from the plurality of squeezed light sources of the GBS circuit, at least one additional set of squeezed light sources being different from the first and second sets of squeezed light sources. 312

Detect at least one additional photon statistic at at least one additional output port from the plurality of output ports of the GBS circuit. 314

Estimate at least one transformation matrix that represents a linear optical interferometer of the GBS circuit based on the first photon statistic, the second photon statistic, and any additional photon statistics. 316

FIG. 3A

400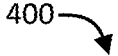

Cause squeezed light to be emitted, sequentially, from each set of at least two squeezed light sources from a plurality of sets of squeezed light sources of a photonic quantum circuit that includes an interferometer.
402

After each sequential emission of squeezed light, measure a correlation function associated with that emission of squeezed light, at an output port from a plurality of output ports of the photonic quantum circuit, to produce a plurality of correlation functions.
404

Estimate a plurality of phases of a transformation matrix that represents the interferometer based on the plurality of correlation functions. 406

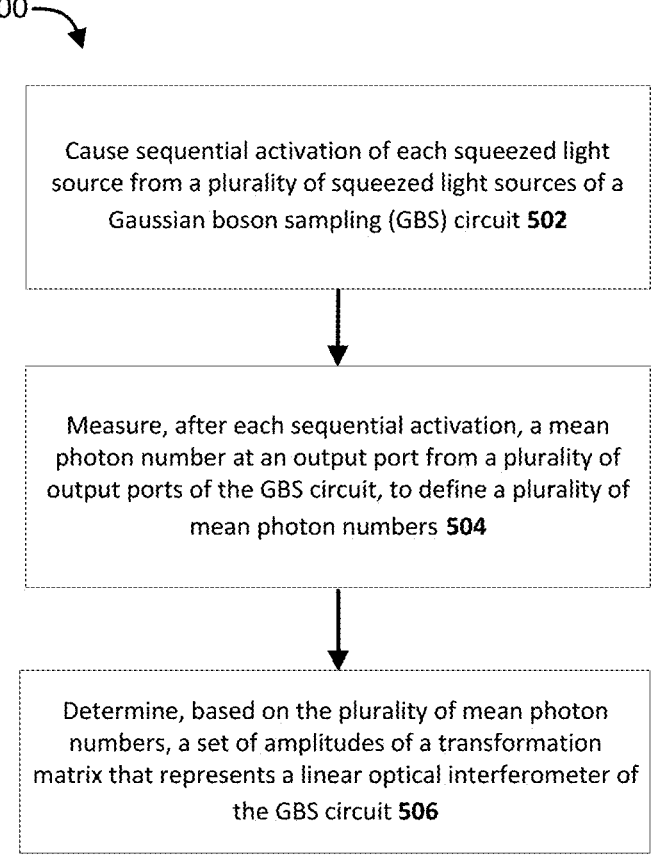

Cause sequential activation of each squeezed light source from a plurality of squeezed light sources of a Gaussian boson sampling (GBS) circuit 502

Measure, after each sequential activation, a mean photon number at an output port from a plurality of output ports of the GBS circuit, to define a plurality of mean photon numbers 504

Determine, based on the plurality of mean photon numbers, a set of amplitudes of a transformation matrix that represents a linear optical interferometer of the GBS circuit 506

METHODS FOR IN-SITU CHARACTERIZATION OF GAUSSIAN BOSON SAMPLING (GBS) DEVICES

CROSS-REFERENCE TO RELATED PATENT APPLICATIONS

This application claims the benefit of, and priority to, U.S. Provisional Application No. 63/214,494, filed Jun. 24, 2021 and titled "Methods for In-Situ Characterization of Gaussian Boson Sampling (GBS) Devices," the entire content of which is incorporated herein by reference for all purposes.

FIELD

The present disclosure is related to quantum computing, and more specifically, to the characterization of Gaussian Boson Sampling (GBS) devices.

BACKGROUND

Quantum tomography or quantum state tomography is the process by which a quantum state is reconstructed using measurements on an ensemble of identical quantum states.

SUMMARY

In some embodiments, a method includes causing activation, at a first time, of a first set of squeezed light sources from a plurality of squeezed light sources of a Gaussian boson sampling (GBS) device (e.g., a GBS circuit). At a second time after the first time, a first photon statistic is detected at a first output port from a plurality of output ports of the GBS device. At a third time after the first time, a second set of squeezed light sources from the plurality of squeezed light sources of the GBS device is activated, the second set of squeezed light sources being different from the first set of squeezed light sources. At a fourth time after the third time, a second photon statistic is detected at a second output port from the plurality of output ports of the GBS device. At least one transformation matrix is estimated that represents a linear optical interferometer of the GBS device based on the first photon statistic and the second photon statistic.

BRIEF DESCRIPTION OF THE DRAWINGS

The drawings primarily are for illustration purposes and are not intended to limit the scope of the subject matter described herein. The drawings are not necessarily to scale; in some instances, various aspects of the disclosed subject matter disclosed herein may be shown exaggerated or enlarged in the drawings to facilitate an understanding of different features. In the drawings, like reference characters generally refer to like features (e.g., functionally similar and/or structurally similar elements).

FIGS. 3A-3B and 4-5 are flow diagrams showing methods for estimating a transformation matrix of a linear optical interferometer of a GBS device, according to some embodiments.

DETAILED DESCRIPTION

Figure 1:
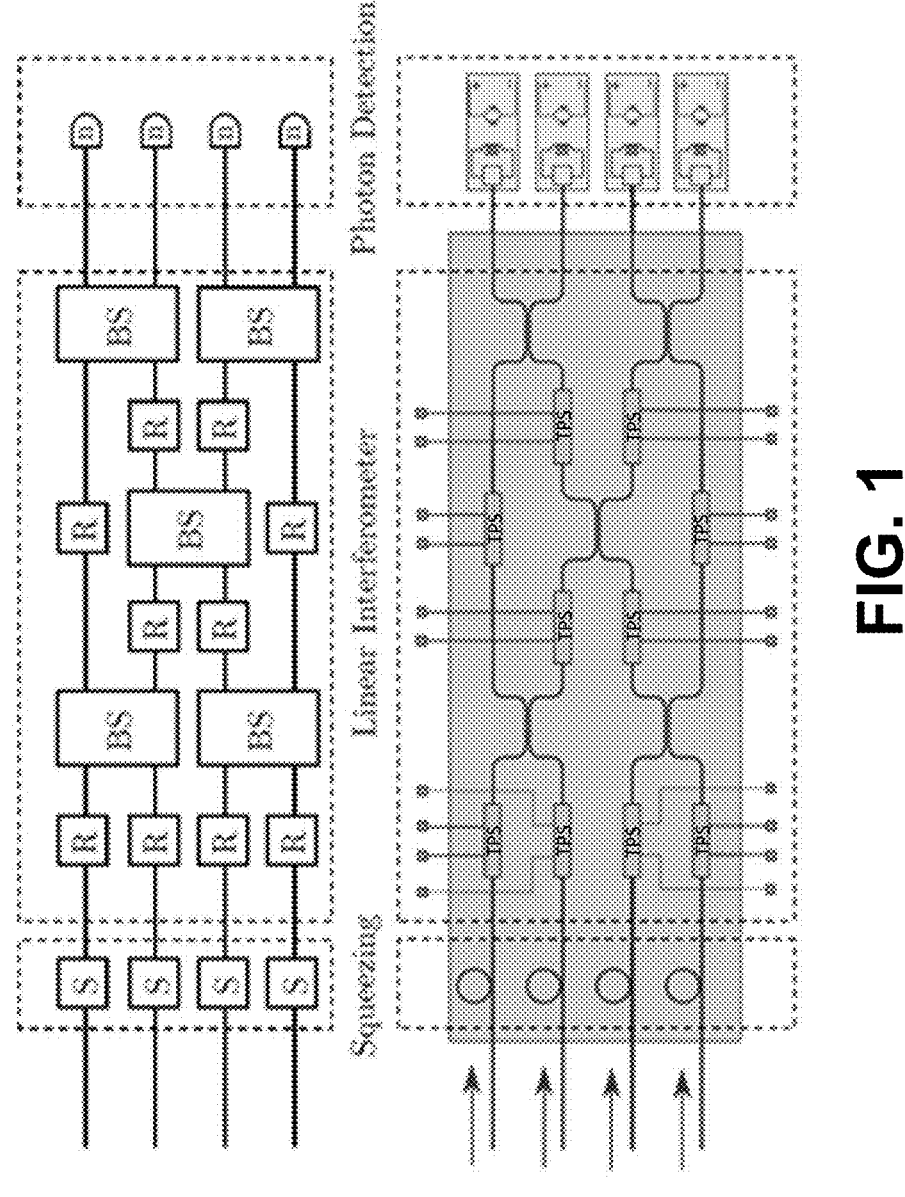
FIG. 1 is a schematic illustration of a GBS device, according to an embodiment.

Embodiments set forth herein include methods for performing tomography on Gaussian boson sampling (GBS) devices. GBS devices include squeezed light sources (either degenerate or twin-beam) that interfere at a linear optical interferometer and are detected by photon number resolving detectors (PNRs) at the output ports. Quantum tomography can include the task of determining the transformation matrix implemented by the linear optical interferometer. Known methods of classical tomography typically rely on sending classical light into the interferometer and measuring the output light using photodiodes that measure light intensity. Such procedures typically involve introducing additional components to GBS devices (to allow for classical light input and intensity detection at output). Furthermore, the unitary matrices returned by such measurements can have systematic errors resulting from differences between (1) the characteristics of the classical light and intensity detectors, and (2) the quantum light sources and the PNRs.

According to some embodiments set forth herein, methods for in-situ tomography use only the squeezed light and PNRs from the GBS device itself, without introducing additional components. Such methods can include turning (powering) the squeezers on and off systematically and using the photon counts obtained at the PNRs to determine the elements of the transformation matrices implemented by the linear optical interferometer.

In some embodiments, a method includes characterizing a unitary transformation effected by a GBS device that includes twin-beam squeezers and degenerate squeezers, using a correlation function such as $g^{(1,\ 1)}$ (discussed below) to determine the effect of interference of two squeezers or squeezed modes. Correlation functions set forth herein are presented in multiple forms, depending on whether the output modes k and 1 are degenerate or twin-beam. This method can be especially useful for GBS devices in which squeezers and detectors are fixed. It can be desirable to use the same kind of light when performing tomography as the kind of light that is used in the actual experiment, for example because using classical light to perform unitary tomography may not yield the correct phases, as different polarizations could result in different phases.

When the squeezers are degenerate, the interferometer can be described by a single matrix U. The transformation U between the input modes $a_i$ and the output mode $c_j$s can be defined by the relation:

$$\hat{c}_j = \sum_i U_{ji}\hat{a}_i \tag{1}$$

In the case of restricted GBS (e.g., with two-mode squeezed states as inputs), the input signal and idler modes $a_i$ and $b_i$ could undergo different transformations. The transformations U, V are defined such that the input modes are converted to the output signal and idler modes $c_j$ and $d_j$ by the transformations:

$$\hat{c}_j = \sum_i U_{ji}\hat{a}_i \tag{2}$$

$$\hat{d}_j = \sum_i V_{ji}\hat{b}_i$$

Note that U and V need not be unitary because they can include the effects of losses. In some embodiments, it is desirable to find/identify the elements of U and V using only the available squeezed light and photon-number-resolving detectors, without introducing additional components.

GBS Device Characterization Procedure

In some embodiments, an algorithm is used to find the elements of the transformation matrices effected by the interferometer. The procedure can assume that the squeezing parameters of each of the squeezers are known beforehand (e.g., as determined through squeezer characterization experiments). It can also be assumed, in some instances, that the squeezers produce only one Schmidt mode in each output (i.e., each output of the squeezers has a Schmidt number of one, regardless of whether the squeezers have one output or two outputs). As used herein, a single Schmidt mode refers to each squeezer output being in a pure state that is not spread in frequency or color. Also, for purposes of the following discussion, it is assumed that U=V, although the procedure can be generalized for applicability to U and V being different.

Note that in some implementations, when only considering photon statistics, it may not be possible to determine a unique transformation matrix U since many unitary matrices can yield the same photon statistics. As such, procedures of the present disclosure may return a matrix having the form:

$$A = U\text{diag}(\lambda_1, \lambda_2, \ldots, \lambda_N)U^T, = :URU^T \qquad (3)$$

Rather than a unitary matrix U. Here, $\lambda_i = \tan h\, r_i$ where $r_i$s are the squeezing values. The "diag" function is a function that returns a diagonal matrix. In other words:

$$R = \begin{pmatrix} \lambda_1 & 0 & 0 & \ldots & 0 \\ 0 & \lambda_2 & 0 & \ldots & 0 \\ 0 & 0 & \lambda_3 & \ldots & 0 \\ & & \ldots & & \\ 0 & 0 & 0 & \ldots & \lambda_N \end{pmatrix}$$

An example algorithm to find the elements $U_{ij} = x_{ij}e^{i\Theta_{ij}}$ of U is presented below. The input indices are named a, b and the output indices are k, $\ell$ In connection with this algorithm, a maximum of 2 squeezers are turned on at a time, and the photon numbers are measured at 2 output ports.

A. Finding Amplitudes

To find the amplitudes, one squeezer at a time, from a set/plurality of squeezers of a GBS circuit, is turned on (also referred to herein as "activated", caused to "emit" or "powered on"), and the associated mean photon numbers or photon statistics are measured at the output ports of the GBS circuit. This approach works for both twin-beam and degenerate squeezers. When the squeezer at mode a is turned on and the mean photon number n at mode k is measured, the following relation is obtained:

$$n_k = x_{ka}^2 \sinh2(r_a) \qquad (4)$$

Using the known squeezing parameters and measuring the mean photon numbers, the amplitudes $x_{ka}$ of U can be found/estimated.

B. Finding the Phases

In some embodiments, to find the phases of the elements of a transformation matrix U, two squeezers are interfered (i.e., squeezed light outputs from two squeezers are caused to interfere with one another), and associated correlation functions are measured at the outputs of a GBS device. The function that is measured can depend on the type of squeezed light source(s) used. For example, for twin-beam sources, squeezers of modes a and b can be turned on, and the signal of output mode k and the idler of output mode $\ell$ can be measured. The correlation function $$g_{k,\ell}^{(1,1)}(a, b)$$

between signal mode k and idler mode $\ell$ can be calculated from the measured photon statistics. This correlation function provides a basis for estimating the phases as is detailed in the algorithm. The $$g_{k,\ell}^{(1,1)}(a, b)$$

between modes k and $\ell$ for input modes at a, b can be given by the expression:

$$g_{k,\ell}^{(1,1)}(a, b) = 1 + \{x_{ka}^2 x_{\ell a}^2 s_a^2 c_a^2 + x_{kb}^2 x_{\ell b}^2 s_b^2 c_b^2 + 2x_{ka}x_{\ell a}x_{kb}x_{\ell b}s_a c_a s_b c_b \times \qquad (5)$$
$$\cos(\theta_{ka} + \theta_{la} - \theta_{kb} - \theta_{\ell b}\}/\{(x_{ka}^2 s_a^2 + x_{kb}^2 s_b^2)(x_{\ell a}^2 s_a^2 + x_{\ell b}^2 s_b^2)\}$$

where each $\theta$ represents a phase difference between the noted inputs and outputs, for ease of notation, the following abbreviations are used:

$$\sin h r_a =: s_a, \cos h r_a =: c_a. \qquad (6)$$

Since the $x_{ka}$s has already been determined, and the squeezing parameters $r_a$s are known, measuring the g yields the value of cos $$(\theta_{ka} + \theta_{\ell a} - \theta_{kb} - \theta_{\ell b}).$$

For degenerate squeezers, in some embodiments, squeezers of modes a and b are turned on, and the $$g_{k,\ell}^{(1,1)}(a, b)$$

is measured between k and $\ell$. This function is calculated to be:

$$g_{k,\ell}^{(1,1)}(a, b) = 1 + \{x_{ka}x_{\ell a}s_a^2(c_a^2 + s_a^2) + x_{kb}^2 x_{\ell b}^2 s_b^2(c_b^2 + s_b^2) + \qquad (7)$$
$$2x_{ka}x_{\ell a}x_{kb}x_{\ell b}s_a s_b \times [c_a c_b \cos(\theta_{ka} + \theta_{la} - \theta_{kb} - \theta_{\ell b})]\} +$$
$$s_a s_b \cos(\theta_{ka} - \theta_{\ell a} - \theta_{kb} - \theta_{\ell b})]/\{(x_{ka}^2 s_a^2 + x_{kb}^2 s_b^2)(x_{\ell a}^2 s_a^2 + x_{\ell b}^2 s_b^2)\}.$$

The term $c_a c_b$ cos $$(\theta_{ka} + \theta_{\ell a} - \theta_{kb} - \theta_{\ell b}) + s_a s_b \cos(\theta_{ka} - \theta_{\ell a} - \theta_{kb} + \theta_{\ell b})$$

can be written as only one cosine function in terms of the phase angle $\theta_{\ell b}$. Specifically, $$c_a c_b \cos(\theta_{ka} + \theta_{\ell a} - \theta_{kb} - \theta_{\ell b}) + s_a s_b \cos(\theta_{ka} - \theta_{\ell a} - \theta_{kb} + \theta_{\ell b}) = \tag{8}$$

$$\sqrt{1 - \frac{2 s_a s_b c_a c_b \cos 2(\theta_{ka} - \theta_{kb})}{c_a^2 c_b^2 + s_a^2 s_b^2}} \cos(\tilde{\theta} - \theta_{\ell a} + \theta_{\ell b})$$

where $$\cos\theta = \frac{(c_a c_b + s_a s_b)\cos(\theta_{ka} - \theta_{kb})}{\sqrt{c_a^2 c_b^2 + s_a^2 s_b^2 - 2 s_a s_b c_a c_b \cos 2(\theta_{ka} - \theta_{kb})}} \tag{9}$$

As with the case of twin-beam squeezers, information about the phases can be obtained when the amplitudes and squeezing parameters are known.

Example Algorithms

In some embodiments, an algorithm is used to estimate all of the phases of the elements of the transformation matrix uniquely, from known quantities. Note that, from the expressions for the correlation functions (Eq. (5) and Eq. (7)), known values of $\theta_{ka}$, $\theta_{kb}$, and $\theta_{\ell a}$ can be used to determine any phase $\theta_{\ell b}$. When only the cosines of the angles are measured, the determined angles are not unique and thus should be compared against other correlation function measurements. Hence, the order of finding the different angles is important.

An example algorithm is as follows:

1. As the reference row and column, select a row and column of U having a largest number of non-zero elements, i.e., the highest incidence of $x_{k\alpha} \approx 0$ and $x_{\beta\alpha} \approx 0$ for a given $\alpha$ and $\beta$, where $\alpha$ and $\beta$ refer to row and column indices, respectively. Since the rows and columns can be permuted, the first row and column can be selected, i.e., $\alpha = \beta = 0$.

2. Set all the phases of the first (or $\beta$th) column to zero, i.e., $\theta_{\ell 0} = 0$.

3. To obtain the phases for the first (or $\alpha$th) row, set output modes k and l equal to zero ($k = \ell = 0$), i.e., only measure the correlation function at output mode 0.

First, the first non-zero phase $\theta_{01}$ is determined by setting a=0 and b=1, and measuring $$g_{0,0}^{(1,1)}(0, 1).$$

The value of $\cos(2\theta_{01})$ can thus be inferred. The phases of this row are restricted such that they all lie between 0 and $\pi$. By defining $\gamma = \cos^{-1}(2\theta_{01})$, it can be inferred that there are two possible solutions for $\theta_{01}$ with this restriction, namely:

$$\theta_{01} = \gamma/2 \text{ or } \pi - \gamma/2. \tag{10}$$

These two possible solutions, however, which lead to two different inferred matrices for U, may nevertheless yield the same photon statistics, as shown in the next section. As long as a consistent approach is applied, either solution may be selected.

4. To determine the other angles in the first row, a similar procedure can be followed, but with the additional step of checking with the already-determined angles for consistency. For example, from $$g_{0,0}^{(1,1)}(0, b), \cos(2\theta_{0b})$$

(0, b), $\cos(2\theta_{0b})$ is obtained, which yields:

$$\theta_{0b} = \gamma/2 \text{ or } \pi - \gamma/2. \tag{11}$$

The same angle $\theta_{0b}$, however, can also be inferred from $$g_{0,0}^{(1,1)}(b - 1, b),$$

which yields the value $\cos(2\theta_{0,b-1} - 2\theta_{0b})$. The value of $\theta_{0b}$ that is consistent with both of the measured $g^{(1,1)}$ values may be selected.

5. To determine the remainder of the angles of the transformation matrix U, the values of the determined angles of the first row and first column may be used. Two possible values of $\theta_{\ell,b}$ can be determined by measuring $$g_{0,\ell}^{(1,1)}(0, b),$$

and knowing the angles $\theta_{0,0}$, $\theta_{0,b}$ and $\theta_{\ell,0}$ from previous steps. The degeneracy can be broken by also measuring $$g_{\ell,\ell}^{(1,1)}(0, b)$$

and selecting the value of $\theta_{\ell,b}$ that is consistent with both of the measured qualities.

6. The foregoing steps can be repeated when dealing with elements of U whose amplitudes are non-zero. If, however, $x_{\ell 0}$ or $x_{0b}$ are zero, we once again start from step 3 and have two choices for $\theta_{\ell b}$ like in Eq. (10). Again, selecting any of the two options leads to the same photon statistics.

When performing methods described herein, in accordance with some embodiments, a variety of different choices can be made in the context of estimating the phases of the elements of the transformation, while still yielding the same A matrix, and thus the same photon statistics. For example, for the assumptions made in steps 2 and 3 above (i.e., that that phases in one column can be set to zero and the angles of one row can be restricted to the range $[0, \pi]$), note that first, the phases at the outputs of the interferometer do not impact the photon statistics, and second, since the input modes are single-mode or two-mode squeezed states, the input phases only matter modulo $\pi$. In other words, the input phases affect the overall interference pattern, and as an example, $\theta_1$ and $\theta_2$ on the inputs would give the same output counts as $\theta_{1+\varphi}$ and $\theta_{1+\pi}$. This implies that the elements of U can always be selected such that the elements of a given column are real (not imaginary) and that the elements of a given row have only positive phases. Specifically, if the elements are written as $U_{ij} = x_{ij} e^{i\theta_{ij}}$, one can always select the angles such that $$\theta_{i\alpha} = 0 \tag{12}$$

$$\theta_{\beta j} \in [0, \pi]$$

for a fixed $\alpha$ and $\beta$, without changing the statistics.

It can be shown that different Us with the restrictions of equations (12) yield the same photon statistics by observing that the probability of a given photon pattern depends on $|\text{Haf}(A)|^2$ where Haf is the hafnian, and A is given by Eq. (3). The addition of these arbitrary phases at the outputs and $\pi$ phases at the inputs leads to the transformation matrix U changing as U→PUQ where P and Q are diagonal matrices, with elements of P taking any random phase $e^{i\phi}$ and elements of Q being ±1. The transformed A matrix is therefore $A'=PUQRQ^TU^TP^T$, which is equal to $PURU^TP^T$ because $QRQ^T=R$. Also, since the elements of P are only phases, it can be seen that Haf(A')=Haf(A) from the definition of the Hafnian. Thus, the probability of photon patterns does not change.

Next, consider the second assumption made in step 3 above—that choosing either of the two options in Eq. (10) leads to a transformation U that yields the same photon statistics. It can be seen that selecting $\theta_{01}=\beta/2$ as opposed to selecting $\theta_{01}=\pi-\beta/2$ leads to obtaining the unitary matrix U as opposed to U*D where D is a diagonal matrix whose entries are ±1. The A matrix corresponding to the transformation U*D is $\tilde{A}=U*DRD^TU^\dagger=U*RU^\dagger$, which is equal to A*. Since the probability of a photon pattern depends on $|\text{Haf}(A)|^2$, both A and A* yield the same photon statistics.

To summarize, the various different assumptions made in the algorithm can all yield, or result in, either the same A, or to $PAP^T$ (where P is a diagonal matrix with $|P_{ii}|=1$), or to A*, thus yielding the same photon statistics. As such, a possible metric for characterizing the quality of the transformation can be written as:

$$|Tr(AA^*) - Tr(A_0 A_0^*)| \tag{13}$$

for some target $A^0$.

FIG. 1 is a schematic illustration of a GBS circuit/chip for creating and measuring a Gaussian state with zero displacement, according to some embodiments. The upper portion of FIG. 1 shows a sequence of gates of the GBS chip, that are used to define the Gaussian state: squeezing gates ("S"), followed by a linear interferometer that can be decomposed in terms of rotation ("R") and beamsplitter ("BS") gates. The state is then measured in the Fock basis, revealing the number of photons detected in each mode. The effect of the linear interferometer on the input light can be determined using one or more methods of the present disclosure, for example as part of a calibration of the settings of the linear interferometer.

The lower portion of FIG. 1 is a schematic of a photonic chip for implementing the circuit shown in the top half of FIG. 1. A bright pump laser enters the chip, which is used to generate squeezing in a neighboring mode via nonlinear effects in a microring resonator. Rotation gates are implemented using tunable phase-shifters (boxes marked "TPS," with electrical contacts, collectively labelled as "Linear Interferometer"). Beamsplitters are implemented through evanescent coupling of waveguides that are brought into close proximity of one another. The beamsplitters can be made tunable by extending them to a Mach-Zehnder interferometer (not shown). Finally, output light is measured using photon-number-resolving detectors (labeled as "Photon Detection"), which can be implemented for example using superconducting transition edge sensors.

Figure 2:
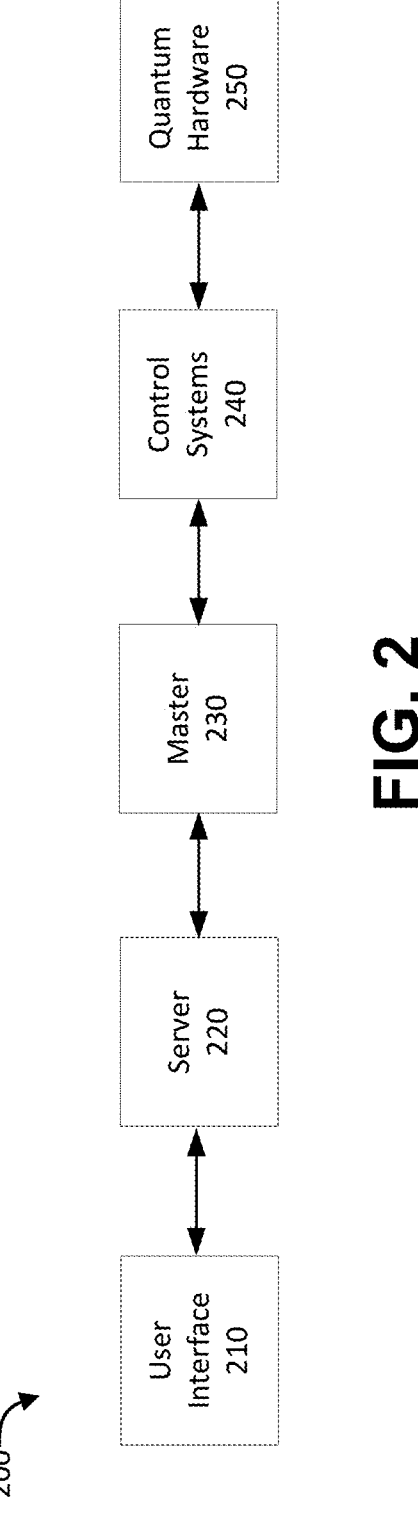
FIG. 2 shows a schematic of a GBS system that provides user access to the measurement and setting of quantum hardware, according to an embodiment.

FIG. 2 shows a schematic of a GBS system that provides user access to the measurement and setting of quantum hardware, according to an embodiment. In the GBS system 200, the hardware elements responsible for input state preparation, interferometer transformation, and output state detection, are henceforth referred to as the quantum hardware (QH) 250 (an example of which is shown and described with reference to FIG. 1). Parameter setting of QH can be accomplished with a set of classical computers and associated communication interfaces. More specifically, a master unit 230 is dedicated to running, monitoring, and receiving results from the QH 250, via a set of control systems 240. Clients can access the master unit 230 (and thus the QH 250) via a user interface 210. In some embodiments, the user interface 210 is locally connected to the master unit 230. In some embodiments, clients can access the master unit 230 via the internet (i.e., the user interface 210 includes a network interface). In either case, instructions can be passed to the hardware via an application program interface (API). In the internet-access model (also referred to as the cloud access model), clients can communicate with a server 220 via secure web link, which, in turn, communicates with the master unit 230. For remote access, user interface 210 can be connected to server 220 via a wired or wireless network (e.g., internet) connection. In some implementations, server 220 and master unit 230 are connected via fast cable(s)/high speed cable(s). Alternatively or in addition, in some implementations, master unit 230, control systems 240, and/or QH 250 use one or more high speed connection protocols, or analog wiring (e.g., in the case of control systems 240 and/or QH 250).

Figure 3B:
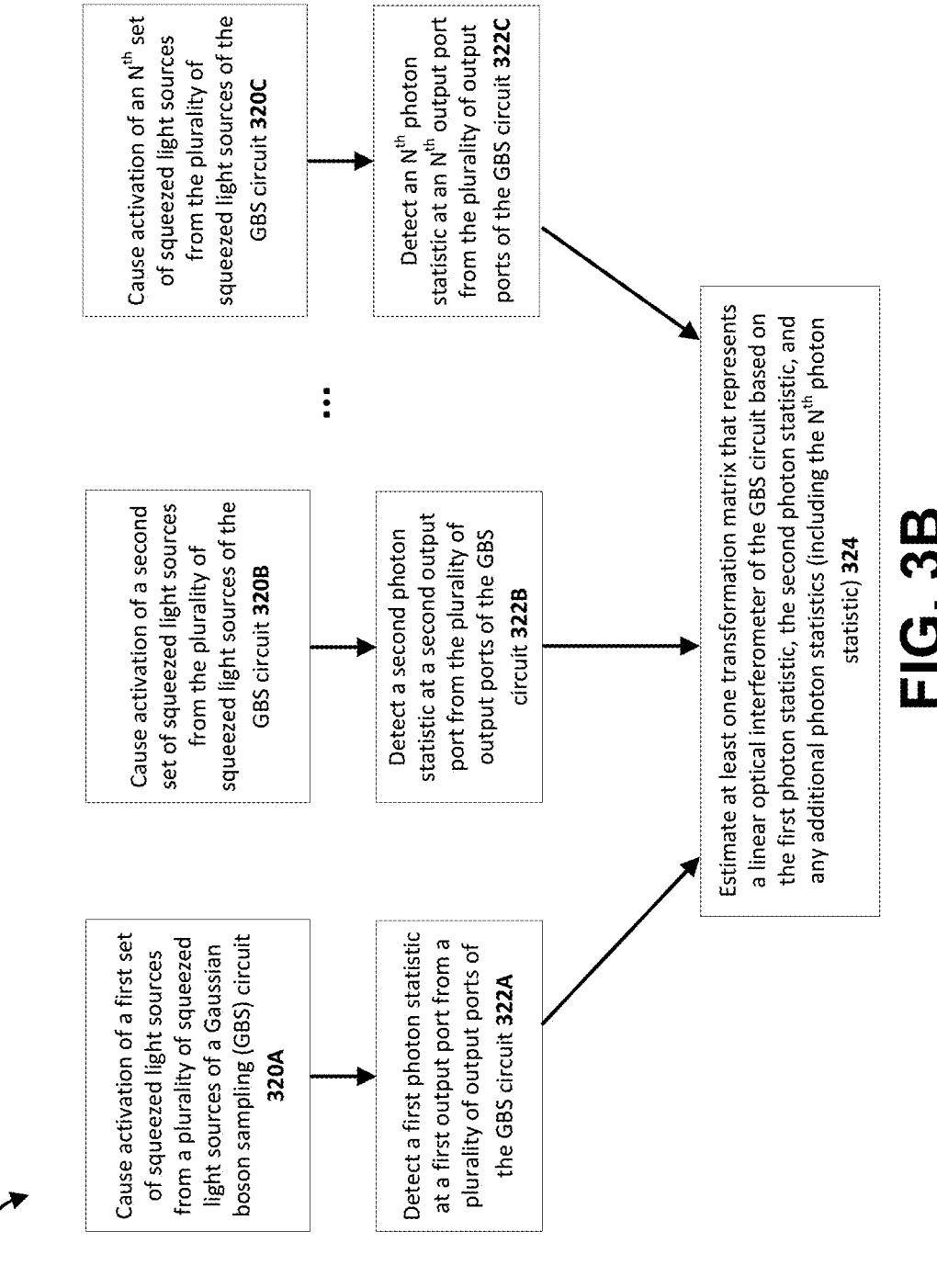

FIGS. 3A-3B and 4-5 are flow diagrams showing methods for estimating a transformation matrix of a linear optical interferometer of a GBS circuit, according to some embodiments. The methods of FIGS. 3A-3B and 4-5 can be implemented using, for example, the GBS system 200 of FIG. 2. As shown in FIG. 3A, a method 300A includes causing activation, at 302 and at a first time, of a first set of squeezed light sources from a plurality of squeezed light sources of a Gaussian boson sampling (GBS) circuit. At 304, at a second time after the first time, a first photon statistic is detected at a first output port from a plurality of output ports of the GBS circuit. At 306, at a third time after the first time, a second set of squeezed light sources from the plurality of squeezed light sources of the GBS circuit is activated, the second set of squeezed light sources being different from the first set of squeezed light sources. At 308, at a fourth time after the third time, a second photon statistic is detected at a second output port from the plurality of output ports of the GBS circuit. Each of the first photon statistic and the second photon statistic can be used to estimate an element (e.g., representing an amplitude) of a transformation matrix that represents a linear optical interferometer of the GBS circuit. At 310, a determination is optionally made as to whether additional elements from the transformation matrix remain to be estimated. If so, at least one additional set of squeezed light sources from the plurality of squeezed light sources of the GBS circuit is activated at 312, the at least one additional set of squeezed light sources being difference from the first and second sets of squeezed light sources. At least one additional photon statistic is then detected, at 314, via at least one additional output port from the plurality of output ports of the GBS circuit. Subsequent to step 314, or if no additional elements from the transformation matrix remain to be estimated at 310, or if step 310 is not implemented, the transformation matrix representing the linear optical interferometer of the GBS circuit (or at least one amplitude thereof) is estimated at 316 based on the first photon statistic, the second photon statistic, and any additional photon statistics (e.g., if detected at 314).

In the embodiment of FIG. 3B, a method 300B includes causing activation, at 320A, of a first set of squeezed light sources from a plurality of squeezed light sources of a GBS circuit. The method 300B also includes causing activation, at 320B, of a second set of squeezed light sources from the plurality of squeezed light sources of the GBS circuit. The method 300B also includes one or more additional activation steps, up to an $N^{th}$ iteration at 320, which includes causing activation, at 320C, of an $N^{th}$ set of squeezed light sources from the plurality of squeezed light sources of the GBS circuit. At 322A, a first photon statistic is detected at a first output port from a plurality of output ports of the GBS circuit, and at 322B a second photon statistic is detected at a second output port from the plurality of output ports of the GBS circuit. The method 300B also includes one or more additional detection steps, up to the $N^{th}$ iteration at 322C, which includes detecting an $N^{th}$ photon statistic at an $N^{th}$ output port from the plurality of output ports of the GB S circuit. At 324, at least one transformation matrix is estimated, the at least one transformation matrix representing a linear optical interferometer of the GBS circuit based on the first photon statistic, the second photon statistic, and any additional photon statistics (including the $N^{th}$ photon statistic).

In some implementations, at least one of the first output port of the GBS circuit or the second output port of the GBS circuit is optically coupled to a photon number resolving detector (PNR) detector. For example, all output ports of the GBS circuit may be coupled to one or more associated PNR detectors.

In some implementations, the at least one transformation matrix includes a substantially unitary matrix.

In some implementations, at least one of the first photon statistic or the second photon statistic includes a photon count and does not include phase information.

In some implementations, the method also includes causing sequential activation of each squeezed light source from the plurality of squeezed light sources, during a first time period preceding the first time, and measuring, during the first time period and after each sequential activation, a mean photon number at the plurality of output ports. The mean photon numbers after each sequential activation collectively define a plurality of mean photon numbers. Also during the first time period, a set of amplitudes of the at least one transformation matrix is determined based on the plurality of mean photon numbers. Optionally, the determining the set of amplitudes of the at least one transformation matrix is further based on squeezing parameters of the plurality of squeezed light sources.

In some implementations, each squeezed light source from the plurality of squeezed light sources has a fixed configuration, as determined by the associated level of squeezing (or "$r_i$" squeezing value).

In some implementations, the plurality of squeezed light sources includes degenerate squeezed light sources.

In some implementations, the plurality of squeezed light sources includes twin-beam squeezed light sources.

As shown in FIG. 4, a method 400 includes causing squeezed light to be emitted, at 402, sequentially from each set of at least two squeezed light sources from a plurality of sets of squeezed light sources of a photonic quantum circuit that includes an interferometer. After each sequential emission of squeezed light, at 404, a correlation function associated with that emission of squeezed light is measured, at an output port from a plurality of output ports of the photonic quantum circuit, to produce a plurality of correlation functions. A plurality of phases of a transformation matrix is estimated at 406, the transformation matrix representing the interferometer based on the plurality of correlation functions.

In some implementations, for each sequential emission of squeezed light, the correlation function for that sequential emission of squeezed light and from the plurality of correlation functions is associated with a type of the squeezed light sources for that sequential emission of squeezed light.

In some implementations, the plurality of sets of squeezed light sources includes degenerate squeezed light sources.

In some implementations, the plurality of sets of squeezed light sources includes twin-beam squeezed light sources.

In some implementations, at least one output port from the plurality of output ports of photonic quantum circuit is optically coupled to a photon number resolving detector (PNR) detector.

In some implementations, the transformation matrix includes a substantially unitary matrix.

In some implementations, the method also includes causing sequential activation of each squeezed light source from a plurality of squeezed light sources that includes the plurality of sets of squeezed light sources, and measuring, for each sequential activation, a photon statistic from a plurality of photon statistics at the plurality of outputs of the photonic quantum circuit. A set of amplitudes of the transformation matrix is then determined based on the plurality of photon statistics. The determining the set of amplitudes of the transformation matrix can further be based on squeezing parameters of the plurality of squeezed light sources. Optionally, the plurality of sets of squeezed light sources can be selected based on at least one of known (e.g., already measured) or expected amplitudes of the transformation matrix.

In some implementations, the squeezed light has one of a single-mode squeezed state or a two-mode squeezed state.

In the embodiment of FIG. 5, a method 500 includes causing sequential activation, at 502, of each squeezed light source from a plurality of squeezed light sources of a GBS circuit. At 504, and after each sequential activation occurring at 502, a mean photon number is measured at an output port from a plurality of output ports of the GBS circuit, to define a plurality of mean photon numbers. Based on the plurality of mean photon numbers, a set of amplitudes of a transformation matrix is determined, at 506, the transformation matrix representing a linear optical interferometer of the GB S circuit.

While various embodiments have been described and illustrated herein, a variety of other means and/or structures for performing the function and/or obtaining the results and/or one or more of the advantages described herein, and each of such variations and/or modifications are possible. More generally, all parameters, dimensions, materials, and configurations described herein are meant to be examples and that the actual parameters, dimensions, materials, and/or configurations will depend upon the specific application or applications for which the disclosure is used. It is to be understood that the foregoing embodiments are presented by way of example only and that other embodiments may be practiced otherwise than as specifically described and claimed. Embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, various concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of" or "exactly one of." "Consisting essentially of" when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A method, comprising:
   causing activation, at a first time, of a first set of squeezed light sources from a plurality of squeezed light sources of a Gaussian boson sampling (GBS) circuit;
   detecting, at a second time after the first time, a first photon statistic at a first output port from a plurality of output ports of the GBS circuit;
   causing activation, at a third time after the first time, of a second set of squeezed light sources from the plurality of squeezed light sources of the GBS circuit, the second set of squeezed light sources being different from the first set of squeezed light sources;
   detecting, at a fourth time after the third time, a second photon statistic at a second output port from the plurality of output ports of the GBS circuit; and
   estimating at least one amplitude of a transformation matrix that represents a linear optical interferometer of the GBS circuit based at least in part on the first photon statistic and the second photon statistic.

2. The method of claim 1, wherein at least one of the first output port of the GBS circuit or the second output port of the GBS circuit is optically coupled to a photon number resolving (PNR) detector.

3. The method of claim 1, wherein at least one of the first photon statistic or the second photon statistic includes a photon count and does not include phase information.

4. The method of claim 1, further comprising:
   causing sequential activation of each squeezed light source from the plurality of squeezed light sources, during a first time period preceding the first time;
   measuring, during the first time period and after each sequential activation, a mean photon number at the plurality of output ports, the mean photon number after each sequential activation collectively defining a plurality of mean photon numbers; and
   determining, during the first time period, a set of amplitudes of the at least one transformation matrix based on the plurality of mean photon numbers.

5. The method of claim 4, wherein determining the set of amplitudes of the at least one transformation matrix is further based on squeezing parameters of the plurality of squeezed light sources.

6. The method of claim 1, wherein each squeezed light source from the plurality of squeezed light sources has a fixed configuration.

7. The method of claim 1, wherein the plurality of squeezed light sources includes degenerate squeezed light sources.

8. The method of claim 1, wherein the plurality of squeezed light sources includes twin-beam squeezed light sources.

9. The method of claim 1, wherein at least one of the first set of squeezed light sources or the second set of squeezed light sources is selected based on an expected amplitude of the transformation matrix.

10. The method of claim 1, wherein at least one squeezed light source from the plurality of squeezed light sources is configured to generate light having a single-mode state.

11. The method of claim 1, wherein at least one squeezed light source from the plurality of squeezed light sources is configured to generate light having a two-mode state.

12. The method of claim 1, wherein the estimating the at least one amplitude is further based on an additional photon statistic.

13. The method of claim 1, further comprising:

activating, subsequent to the fourth time, at least one additional set of squeezed light sources of the GBS circuit, the at least one additional set of squeezed light sources different from the first set of squeezed light sources and the second set of squeezed light sources; and detecting at least one additional photon statistic, via at least one additional output port from the plurality of output ports of the GBS circuit.

14. The method of claim 1, further comprising:

determining, subsequent to the fourth time, that an element of the transformation matrix remains to be estimated; and in response to the determining that the element of the transformation matrix remains to be estimated:

activating at least one additional set of squeezed light sources of the GBS circuit, and detecting at least one additional photon statistic, via at least one additional output port from the plurality of output ports of the GBS circuit.

15. The method of claim 1, wherein each squeezed light source from the plurality of squeezed light sources has a fixed configuration, and the plurality of squeezed light sources includes at least one of a degenerate squeezed light source or a twin-beam squeezed light source.

16. The method of claim 1, wherein each squeezed light source from the plurality of squeezed light sources has a fixed configuration associated with a squeezing value of that squeezed light source.

17. The method of claim 1, wherein each output port from the plurality of output ports of the GBS circuit is optically coupled to a photon number resolving (PNR) detector.

18. The method of claim 1, wherein the transformation matrix includes a substantially unitary matrix.

19. The method of claim 1, further comprising estimating a plurality of phases of the transformation matrix based on at least one correlation function.

20. The method of claim 1, wherein the estimating the at least one amplitude of a transformation matrix is based on a correlation function.

* * * * *